United States Patent
Kimura et al.

(10) Patent No.: US 6,821,546 B1
(45) Date of Patent: Nov. 23, 2004

(54) PROCESS FOR PRODUCTION OF SURIMI FROM FISH INFECTED WITH PARASITES AND UTILIZATION OF SUCH SURIMI

(75) Inventors: Ikuo Kimura, Kanagawa (JP); Genji Ito, Yokohama (JP); Masayuki Nasu, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 09/568,578

(22) Filed: May 11, 2000

(30) Foreign Application Priority Data

Jun. 15, 1999 (JP) .......................................... 11-167653
Dec. 16, 1999 (JP) .......................................... 11-356954

(51) Int. Cl.[7] ............................................. A23L 1/325
(52) U.S. Cl. ...................................................... 426/643
(58) Field of Search ......................................... 426/643

(56) References Cited

U.S. PATENT DOCUMENTS 4,284,653 A    8/1981  Shigeoka et al. ............ 426/312
4,935,192 A  * 6/1990  Porter et al. ............. 426/643 R

FOREIGN PATENT DOCUMENTS

CA    2001244    4/1990

OTHER PUBLICATIONS

Nobuaki Okamoto et al., "Relationships between Water Temperature, Fish Size, Infective Dose and Ichthyphomus Infection of Rainbow Trout", Nippon Suisan Gakkaishi, 53(4), 581–584 (1987).

* cited by examiner

Primary Examiner—Arthur L. Corbin
(74) Attorney, Agent, or Firm—Armstrong, Westerman & Hattori, LLP

(57) ABSTRACT

This invention provides a process for production of surimi with stable quality from fish infected with the parasite *Ichthyophonus hoferi*, and a process for production of surimi based products of good quality using the surimi as the raw material. In the process for production of surimi from parasite-infected fish, an additive for inhibiting protease activity and recovering gel-forming capability, and calcium are added in the process of production of surimi from fish infected with *Ichthyophonus hoferi*, preferably from Alaska pollock. A protease inhibitor, preferably a thiol protease inhibitor, is used as the additive.

9 Claims, 1 Drawing Sheet

(1 of 1 Drawing Sheet(s) Filed in Color)

PROCESS FOR PRODUCTION OF SURIMI FROM FISH INFECTED WITH PARASITES AND UTILIZATION OF SUCH SURIMI

FIELD OF THE INVENTION

This invention relates to a process for production of surimi from fish infected with the parasite *Ichthyophonus hoferi* and to a process for production of a surimi based products using the resultant surimi as the raw material.

BACKGROUND OF THE INVENTION

Production of surimi from fish meat and business of a surimi based products have become a global industry practiced all over the world. On the other hand, because of the controlled fish catch, etc., surimi have become to be produced from raw materials which were never used in production of surimi so far.

The essential process of production of surimi is as follows: Water-soluble proteins which may interfere with gel formation are removed from fish meat proteins by rinsing in water, and the skin, tendon, and bones are removed by a refiner or the like, followed by dehydration so that the gel-forming major protein, i.e., the myofibrilla protein, is concentrated. The resultant dehydrated meat is mixed with sugar, sugar alcohol, and sodium poly-phosphate that serve as agents for prevention of freeze denaturalization, and the mixture is frozen.

The basic process for production of a surimi based product utilizing the surimi comprises the steps of thawing a frozen surimi to some extent, grinding and kneading the surimi by a cutter or the like with salt added to the surimi, further adding seasonings, minor raw materials, etc., and then molding and heating the mixture. The quality of a a surimi based product is evaluated from various viewpoints, among which characteristic physical properties take a great part. Actomyosin, which is the major protein of surimi and soluted from the myofibrils in the step of grinding with salt, plays an important role in gel-formation. Although physical properties of gel of a heated fish cake(Kamaboko in Japanese) vary depending on the fish species used as raw materials, it is known that the physical properties of the boiled surimi gel are influenced by the properties of the proteins unique to the fish species and enzymes contained in the fish meat.

Many fish species are known to be useful as raw materials of surimi, including Alaska pollock (*Theragra chalcogramma*), pacific whiting (*Merluccius productus*), Atka mackerel, sardine, southern blue whiting, hoki, croaker, alfonsino, lizard fish, and Yellow fin sole (*Limamda aspera*). Also, there are many species of parasites that infect fish meat, but only certain species of fish and certain species of parasites are known to develop jellying of fish meat.

For example, it is known that the muscle of pacific whiting (*Merluccius productus*) or Yellow fin sole (*Limamda aspera*) is infected with Myxosporidian so that the activity of protease in the muscle is elevated and develops the jellying, i.e., the muscle is liquefied under heating. If such fish is used as the raw material for surimi, protease acts under heating for formation of the heated surimi gel to degrade the major gel proteins so that the gel cannot be formed. For prevention of this phenomenon, a technique has been developed to produce surimi using a protease inhibitor. (Japanese Patent No. 1,473,166 and U.S. Pat. No. 4,284,653)

SUMMARY OF THE INVENTION

An object of this invention is to provide a process for production of surimi with stable quality from fish infected with the parasite *Ichthyophonus hoferi* in fish meat.

Another object of this invention is to provide a process for production of high-quality a surimi based products using the surimi produced from fish infected with the parasite *Ichthyophonus hoferi* as the raw material.

The gist of this invention resides in a process for production of surimi from parasite-infected fish, wherein an additive for inhibiting protease activity and recovering gel-forming capability is added in the process of production of surimi from fish infected with the parasite *Ichthyophonus hoferi*.

This invention uses a protease inhibitor as the above-mentioned additive and also calcium as needed. Thus the gist of this invention resides in a process for production of surimi from parasite-infected fish, wherein a protease inhibitor is added to inhibit protease activity and recover gel-forming capability and calcium is also added as needed in the process of production of surimi from fish infected with the parasite *Ichthyophonus hoferi*.

When surimi is produced from fish infected with *Ichthyophonus hoferi*, the resultant surimi has a high protease activity and has a poor gel-forming capability. Based on finding of this fact, a protease inhibitor is added to inhibit the protease activity and recover the gel-forming capability. Because the main constituent of protease is thiol protease, a thiol protease inhibitor is preferably used.

Another gist of this invention resides in a process for production of a surimi based product, wherein an additive for inhibiting protease activity is added in production of a surimi based product using surimi produced from fish infected with *Ichthyophonus hoferi* as the raw material.

A protease inhibitor is used as the above-mentioned additive. Thus the gist of this invention resides in a process for production of a surimi based product, wherein a protease inhibitor is added to inhibit protease activity in production of a surimi based product using surimi produced from fish infected with *Ichthyophonus hoferi* as the raw material. Because the main constituent of protease is thiol protease, a thiol protease inhibitor is preferably used.

BRIEF DESCRIPTION OF THE DRAWING

The patent or application file contains at least one drawing executed in color. Copies of this patent or patent application publication with color drawing(s) will be provided by the Office upon request and payment of the necessary fee.

Figure 1:
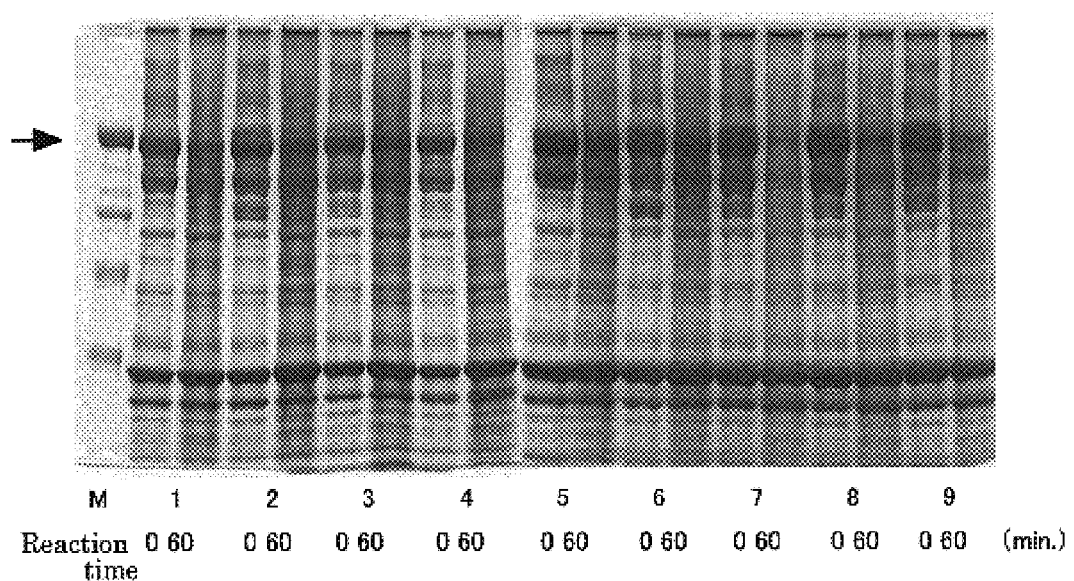
FIG. 1 is a photograph, instead of a drawing, showing the result of SDS-PAGE of protease in the muscle of Alaska pollock infected with *Ichthyophonus hoferi*.

DETAILED DESCRIPTION OF THE PREFERRED EMBODIMENT (Parasite-infected Fish) *Ichthyophonus hoferi*: This parasite forms spot-like cysts in the muscle. The cyst was placed on a slide glass, and after adding a drop of water, crushed with the cover glass, followed by observation under an optical microscope. Thick-walled spherical multinucleate bodies were confirmed, which are characteristic of *Ichthyophonus hoferi*.

Alaska pollock is the major species of fish used for production of surimi, accounting to about 70 percent of the production of surimi in the world, but there have been no reports on deterioration of the quality of surimi caused by Myxosporidian as found in pacific whiting.

The present inventors confirmed on an industrial level that the muscle of Alaska pollock is infected not with Myxosporidian but with *Ichthyophonus hoferi*.

Namely, it was confirmed by the inventors for the first time that the muscle of Alaska pollock is infected with

*Ichthyophonus hoferi*. It was also confirmed by the inventors for the first time that the protease activity in the muscle of Alaska pollock infected with *Ichthyophonus hoferi* shows a very high level and is responsible for a lowering of the quality of surimi.

In other words, the inventors confirmed that *Ichthyophonus hoferi* parasitizing in the muscle of Alaska pollock is involved in suppressing gel formation of fish meat, and adversely influences the quality of surimi produced from the fish.

*Ichthyophonus hoferi* causing a high protease activity and a poor gel-forming capability of surimi is a parasite originally unique to cold-blooded vertebrates including fish primarily, and is not parasitic on human beings. The parasite confirmed here is not parasitic on human beings, and fish infected with the parasite is safe as food. The parasite individuals are sometimes present and visible in the edible part such as fish meat, making people unpleasant or causing degeneration change in quality of fish meat, but they are harmless to the human body even if taken together with fish meat.

(Additives to Inhibit Protease Activity and Recover Gel-forming Capability)

It was confirmed by the inventors that the protease activity is inhibited and the gel strength is recovered by some foods including egg white, whey, and plasma proteins. Namely, in the present invention, the additives used for inhibition of the protease activity and recovery of the gel-forming capability are foods and food additives having the protease inhibiting effect. Such foods include egg white, plasma, whey, fermentation products of malted rice (koji in Japanese), and potato extracts. Calcium in any form may also be used as one of the additives.

(Addition of Additives)

The step of adding a food or a food additive having the protease inhibiting effect during production of surimi may be any stage of production of the surimi. For example, such an additive is mixed in chipped-off meat (otoshimi in Japanese), added to the water for rinsing, or added during the step of adding other desired agents to the dehydrated meat.

Also, a food or a food additive having the protease inhibiting effect is added in the kneading step in production of a surimi based product from the surimi produced from fish meat infected with *Ichthyophonus hoferi* in the muscle.

The inventors have found that addition of foods containing a specific protease inhibitor is effective for improvement of the quality of the surimi produced from the muscle infected with the parasite.

The step of adding such an inhibitor may be any stage before the heating step in production of the a surimi based product, but practically such an additive is added by (1) mixing it in the dehydrated meat or (2) mixing it during grinding in production of the a surimi based product.

Although the amount of egg white to be added is dependent on the activity (amount) of the protease inhibitor in egg white and the level of protease activity in the surimi, a sufficient effect is obtained by adding egg white in the range of 0.01% to 3%, preferably about 0.1%.

Based on the same consideration as for egg white, the amount of plasma to be added is in the range of 0.01% to 1.5%, preferably 0.1 to 0.4%.

Based on the same consideration as for egg white, the amount of whey to be added is in the range of 0.0 1% to 3%, preferably at about 0.4%.

(Confirmation of Parasite)

The cysts of parasite *Ichthyophonus hoferi* can be confirmed with investigation of a parasite infection rate by visual inspection of the fillet. The protease activity in the muscle infected with the parasite is then determined to confirm a high protease activity. This measurement can be easily performed with the procedure described in the Reference Example below.

(Production Process)

In production of a surimi based product containing a food or a food additive having the protease inhibiting effect, surimi is first produced from fish meat infected with *Ichthyophonus hoferi*. For production of the surimi, a food or a food additive having the protease inhibiting effect is applied to the surimi at any stage in the production through contact treatment such as immersing or kneading. Except for that, the surimi can be produced according to the usual procedure for production of surimi. Also, the surimi based product using the surimi thus obtained can be produced according to the usual procedure for production of a surimi based products.

More specifically, fish infected with *Ichthyophonus hoferi* as the raw material are headed and gutted, washed, and meat is separated with a roller-type fish-meat separator or the like. The meat is rinsed in water at least once and then dehydrated by means of a rotary sieve or the like. Small bones, scales, etc. are removed by passing through a refiner or a strainer, etc. To the dehydrated meat obtained by dehydration with a screw press, is added a food or a food additive having the protease inhibiting effect together with a sugar, sodium poly-phosphate, etc. as needed, and the mixture is mixed and kneaded uniformly with a silent cutter or the like. The mixed meat is packaged using a paste-filler or the like to give a raw surimi or a frozen surimi after quick freezing.

During the step of rinsing in water, a food or a food additive having the,protease inhibiting effect may be added to the water for rinsing so that fish meat may be brought into contact with the protease inhibitor. In this case, such an additive may be added or not during the subsequent mixing and kneading step. The additive may be in the form of powder or liquid, and the amount to be added is dependent on the protease activity but in the above-mentioned range. Of course, foods or food additives having the protease inhibiting effect may be used in combination.

For production of a surimi based product, the raw or frozen surimi obtained as mentioned above is used as the raw material. Salt and seasonings are added to the raw surimi as it is or to the frozen surimi after thawing, together with starch, fat, dye, vegetable protein, gelatin, binder, flavor, etc. as needed. The mixture is ground and kneaded with a grinder or silent cutter, molded, packaged or not packaged, and then heated, thereby giving a surimi based product.

Alternatively, surimi is produced without addition of a food or a food additive having the protease inhibiting effect, and this surimi not containing such an additive may be used as the raw material. In this case, a food or a food additive having the protease inhibiting effect is added during the grinding step in production of a surimi based product.

(Discovery of Cause for Lowing of Surimi Quality)

There are many species of fish usable as raw materials of surimi and there are some species of parasites on fish meat. It is known that jellying of fish meat develops in only limited species of fish with limited species of parasites. The parasite *Ichthyophonus hoferi* found by the present inventors is quite different from Myxosporidian found previously. *Ichthyophonus hoferi* has been known as one of parasites, but it has not been known that *Ichthyophonus hoferi* influences the protease activity of fish meat and is responsible for increasing the protease activity. Parasitism of *Ichthyophonus hoferi* on Alaska pollock has been confirmed for the first time by the present inventors on an industrial level.

Then, the present inventors have discovered that the protease activity in fish infected *Ichthyophonus hoferi* is very high. There have been no reports on finding of that fact. In particular, the finding on Alaska pollock has never been reported. The higher the protease activity in the muscle, the higher is the protease activity in the surimi. Protease therefore acts during the heating step in production of a surimi based product, such as a heated fish cake (kamaboko), to deteriorate physical properties of the gel. As a result, although the protein itself in the muscle is capable of forming gel, the quality of the formed gel is lowered by protease and a value of the protein in fish meat is reduced.

Not all of fish are infected with parasites. Fish without infection have a low protease activity in the muscle, and from such fish it is possible to produce surimi of good quality without any problem according to the usual procedure including rinsing in water. The infection rate has been too low to receive an attention in the past, but has become noticeable as the result of restriction of fishing area and fishing season as well as environmental changes. With an increase of the infection rate, the quality of surimi has lowered. Another possible reason why infection with *Ichthyophonus hoferi* has remained unnoticeable hitherto is that infection with Myxosporidian causes a severe deterioration of the quality of surimi, whereas infection with *Ichthyophonus hoferi* deteriorates the quality of surimi, but the deterioration by *Ichthyophonus hoferi* is lower than that by Myxosporidian.

The quality of surimi should be stable. The quality of surimi is however much influenced by the physiological condition and freshness of fish, and other factors.

In addition, as found by the present inventors, the gel-forming capability of surimi is decreased by the elevated protease activity in fish meat when fish infected with *Ichthyophonus hoferi* in the meat is used as the raw material. It was also found that inhibition of the protease activity results in recovery of the gel-forming capability. Thus a more effective method for utilization of marine resources has been established as disclosed in this invention.

EXAMPLES

This invention will be described in detail in connection with Examples. This invention is not limited at all by the Examples.

Reference Example 1

One hundred fillet samples of Alaska pollock were collected from the fish catch of each fishing boat, and examined for the presence of granular cysts in the fillets. Fillets with cysts were observed for the form of white cysts.

It was found that fish with confirmed cysts account to 4–20% in some areas of the sea. The cyst was placed on a slide glass, crushed with the cover glass after applying a drop of water, and observed by an optical microscope of 400 magnifications. As a result, infection with *Ichthyophonus hoferi* was confirmed. Infection with Myxosporidian was not confirmed.

Reference Example 2

The protease activity in the muscle of Alaska pollock was determined as follows: Each fillet was examined carefully for the presence of cysts, and fillets with cysts were used as samples. To 5 g of sliced muscle was added 20 ml of a 0.1 M NaCl in 20 mM Tris-HCl (pH 7.5) solution, and the mixture was homogenized under cooling in ice water. The homogenate was used as a reaction solution and incubated at 60° C. for 30 minutes so that protease should act, and the reaction was terminated by the addition of 15% TCA. The control was prepared by adding 15% TCA to the homogenate before the incubation at 60° C. for 30 minutes. After termination of the reaction upon addition of TCA, the reaction mixture was filtered through a sheet of No. 5 filter paper, and 1 ml of the filtrate was mixed with 5 ml of sodium carbonate solution and 1 ml of the phenol reagent. The mixture was then incubated at 30° C. for 20 minutes, followed by determination of the amount of TCA-solubilized nitrogen. The enzyme activity was expressed in absorbance at 660 nm as the activity unit. The protease activity in the muscle without parasite infection was 0, i.e. undetectable. The protease activity in the muscle infected with the parasite was 0.03 to 0.14, thus indicating a strong protease activity.

Reference Example 3

Identification of the Type of Protease

The type of protease in the muscle of Alaska pollock infected with *Ichthyophonus hoferi* was identified as follows: Each fillet was examined carefully for the presence of cysts, and fillets with cysts were used as samples. To 5 g of sliced muscle was added 15 ml of a 0.1 M NaCl in 20 mM Tris-HCl (pH 7.5) solution, and the mixture was homogenized under cooling in ice water. Each type of protease inhibitor was added to the homogenate to provide a final concentration of 0.9 mM is obtained. The resultant homogenate was used as a reaction solution and incubated at 60° C. for 60 minutes so that the protease should act. Thereafter, a buffer for SDS-PAGE was added, and the homogenate was subjected to SDS-PAGE.

As a result of the observation of SDS-PAGE, degradation of myosin heavy chain was inhibited by thiol protease inhibitors (such as E-64, chymostatin, monoiodine acetate, and antipain) (see FIG. 1).

The above results proved that the main constituent of the parasite protease in the muscle of Alaska pollock is a thiol protease.

Reference Example 4

Infection with *Ichthyophonus hoferi* and Development of Protease Activity

The protease activity of each the samples (43 specimens) of Alaska pollock infected with *Ichthyophonus hoferi* was measured.

The result, degradation of myosin heavy chain (MHC) (obtained by visually determining a reduction in amount of MHC by the SDS-PAGE), is shown in Table 1.

In Table 1, the extent of the degradation of MHC is expressed in accordance with the following ratings. The larger extent of the degradation means that the protease activity exhibits a higher level.

(A): the amount of MHC was much reduced after the reaction, (B): a reduction in amount of MHC was confirmed in comparison with the amount before the reaction, though not so much as the reduction in the group "(A)", and (C): a reduction in amount of MHC was not confirmed in comparison with the amount before the reaction.

TABLE 1

| Degradation of MHC | | | |
|---|---|---|---|
| (A) | (B) | (C) | (A) + (B) |
| 24/43 (55.8) | 13/43 (30.0) | 6/43 (14.0) | 37/43 (86.0) |

( ) represents percentage of the samples infected with the parasite

Among the fish infected with *Ichthyophonus hoferi*, the samples showing the degradation of MHC rated as (B) or (A) amounted to about 86% in the total number of samples. The remaining samples of 14% were infected at a low level.

From the above results, it was concluded that development of the protease activity in the muscle of Alaska pollock due to the presence of parasites was caused by infection with *Ichthyophonus hoferi*.

Working Example 1

From Alaska pollock infected at a proportion of 13% with *Ichthyophonus hoferi*, a frozen surimi was prepared by way of experiment according to the ordinary procedure. Using the same dehydrated meat, another frozen surimi was prepared by way of experiment with dried egg white added to 0.1%. After adding 3% salt to each frozen surimi and grinding the mixture, water was added 30% to provide kneaded meat. Then, the kneaded meat was stuffed into a polyvinylidene chloride tube of 4.5 cm in folded diameter, and gel was produced by way of experiment with heating at 90° C. for 40 minutes (called control gel) or heating at 60° C. for 30 minutes and then at 90° C. for 40 minutes (called degradated gel). After cooling, the gel strength of a cut piece of 2.5 cm in height was measured with a 5-mm globular plunger. The gel strength was expressed by a value resulted from multiplying the breaking strength by the distance of deformation measured at the time when the plunger penetrated into the gel.

The results are shown in Table 2 below. As an index for the degree of destruction of the gel structure by protease, a degradated ratio was calculated by the following formula. The degradated ratio of about 100% indicates that the gel has been destroyed completely.

Degradated ratio=$(A-B)/A \times 100$ where A represents the gel strength of the control gel, and
B represents the gel strength of the degradated gel).

TABLE 2

| Sample | Strength of control gel (g · cm) | Strength of degradated gel (g · cm) | Degradated ratio % |
|---|---|---|---|
| Surimi without egg white | 325 | 184 | 43 |
| Surimi added with egg white | 383 | 380 | 1 |

Addition of egg white improved greatly the degradated ratio from 43% for the surimi without egg white to 1%. The control gel itself was also improved in strength from 325 g·cm to 383 g·cm, i.e. about 1.2-time improvement. The control gel was prepared by directly heating the salted surimi at 90° C. in the production process. The above result therefore indicates that protease acts during elevation of temperature of the gel, and that the protease activity is inhibited with egg white and thus the quality is improved.

According to this invention, as described above, surimi with the same stable quality as that of surimi produced from usual fish meat not infected with the parasite *Ichthyophonus hoferi* can be produced from fish that are infected with *Ichthyophonus hoferi* and are of little value as raw materials for surimi or surimi based products because of poor quality in fish meat. Further, a surimi based product of good quality can be produced using the surimi of this invention.

What is claimed is:

1. A process for production of surimi from parasite-infected Alaska pollock, comprising the steps of:

confirming infection of Alaska pollock with the parasite *Ichthyophonus hoferi*; and adding, to Alaska pollock infected with the parasite *Ichthyophonus hoferi*, an additive for inhibiting protease activity and recovering gel-forming capability.

2. A process for production of surimi from Alaska pollock according to claim 1, wherein said additive comprises a protease inhibitor.

3. A process for production of surimi from Alaska pollock according to claim 1, wherein said additive comprises a thiol protease inhibitor.

4. A process for production of surimi from parasite-infected Alaska pollock, comprising the steps of:

confirming infection of Alaska pollock with the parasite *Ichthyophonus hoferi*; and adding, to Alaska pollock infected with the parasite *Ichthyophonus hoferi*, calcium and an additive for inhibiting protease activity and recovering gel-forming capability.

5. A process for production of surimi from Alaska pollock according to claim 4, wherein said additive is a protease inhibitor.

6. A process for production of surimi from Alaska pollock according to claim 4, wherein said additive comprises a thiol protease inhibitor.

7. A process for production of a surimi based product from parasite infected Alaska pollock, comprising the steps of:

confirming infection of Alaska pollock with the parasite *Ichthyophonus hoferi*; and adding, to Alaska pollock infected with the parasite *Ichthyophonus hoferi*, calcium and an additive for inhibiting protease activity in the process of production of a surimi based product.

8. A process for production of a surimi based product from Alaska pollock according to claim 7, wherein said additive comprises a protease inhibitor.

9. A process for production of a surimi based product from Alaska pollock according to claim 7, wherein said additive comprises a thiol protease inhibitor.

* * * * *